United States Patent
Raza et al.

(10) Patent No.: US 10,952,032 B2
(45) Date of Patent: Mar. 16, 2021

(54) WIRELESS MESH NETWORK AND ASSOCIATED DATA TRANSMISSION NETWORK

(71) Applicant: Kabushiki Kaisha Toshiba, Minato-ku (JP)

(72) Inventors: Usman Raza, Bristol (GB); Jin Yichao, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/815,070

(22) Filed: Nov. 16, 2017

(65) Prior Publication Data

US 2019/0149957 A1    May 16, 2019

(51) Int. Cl.
*H04W 4/06* (2009.01)
*H04L 1/18* (2006.01)
*H04L 12/18* (2006.01)

(52) U.S. Cl.
CPC .......... *H04W 4/06* (2013.01); *H04L 1/1809* (2013.01); *H04L 1/1887* (2013.01); *H04L 12/189* (2013.01)

(58) Field of Classification Search
None
See application file for complete search history.

(56) References Cited

U.S. PATENT DOCUMENTS

| | | | | |
|---|---|---|---|---|
| 5,222,061 A | * | 6/1993 | Doshi | G08C 25/02 370/394 |
| 6,496,520 B1 | * | 12/2002 | Acosta | H04L 1/1642 370/242 |
| 2004/0148396 A1 | * | 7/2004 | Meyer | H04L 1/1685 709/227 |
| 2005/0249215 A1 | * | 11/2005 | Kelsey | H04L 45/34 370/392 |

(Continued)

FOREIGN PATENT DOCUMENTS

| | | |
|---|---|---|
| CN | 103402236 A | 11/2013 |
| JP | 2007-536841 A | 12/2007 |
| WO | WO 2017/037403 A1 | 3/2017 |

OTHER PUBLICATIONS

Li. Wireless Routing and Control: a Cyber-Physical Case Study. IEEE (Year: 2016).*

(Continued)

*Primary Examiner* — Andre Tacdiran
(74) *Attorney, Agent, or Firm* — Oblon, McClelland, Maier & Neustadt, L.L.P.

(57) ABSTRACT

A node comprising a receiver, a transmitter, a controller and memory storing program instructions. The node is suitable for participating in time synchronised data re-transmission within a network. The program instructions cause the controller, when executed by the controller, to receive, via the receiver an indication of other nodes in the network to which data is or is not to be re-transmitted, update a list of other nodes in the network to which data is or is not to be (Continued)

re-transmitted stored within said memory using the indication, determine, based on the list, whether to re-transmits data received from another node in the network and, when it is determined that said data is to be re-transmitted, re-transmit the received data using said transmitter.

11 Claims, 7 Drawing Sheets

(56) References Cited

U.S. PATENT DOCUMENTS

| | | | | |
|---|---|---|---|---|
| 2006/0274780 | A1* | 12/2006 | Walsh | H04L 12/189 370/458 |
| 2009/0016252 | A1* | 1/2009 | Ho | H04W 52/0283 370/311 |
| 2011/0007669 | A1* | 1/2011 | Yoon | H04L 45/026 370/255 |
| 2012/0307653 | A1* | 12/2012 | Vasseur | H04W 40/14 370/252 |
| 2014/0169171 | A1* | 6/2014 | Acker | H04W 40/12 370/235 |
| 2015/0085712 | A1* | 3/2015 | Wang | H04W 52/0235 370/280 |
| 2015/0142945 | A1* | 5/2015 | Brandt | H04W 4/70 709/223 |
| 2015/0200738 | A1* | 7/2015 | Wetterwald | H04W 16/02 370/442 |
| 2017/0005758 | A1* | 1/2017 | Baldemair | H04L 1/1825 |
| 2017/0223712 | A1* | 8/2017 | Stephens | H04W 4/90 |
| 2018/0095915 | A1* | 4/2018 | Prabhakar | H04L 47/36 |

OTHER PUBLICATIONS

Ferrari, Federico, et al. "Efficient Network Flooding and Time Synchronization with Glossy." Information Processing in Sensor Networks (IPSN), 2011 10th International Conference on. IEEE, 2011, pp. 1-12.

Landsiedel, Olaf, Federico Ferrari, and Marco Zimmerling. "Chaos: Versatile and Efficient all-to-all Data Sharing and In-Network Processing at Scale." Proceedings of the 11th ACM Conference on Embedded Networked Sensor Systems. ACM, 2013, pp. 1-14.

Ferrari, Federico, et al. "Low-Power Wireless Bus." Proceedings of the 10th ACM Conference on Embedded Network Sensor Systems. ACM, 2012, pp. 1-14.

Istomin, Timofei, et al. "Data Prediction+ Synchronous Transmissions= Ultra-Low Power Wireless Sensor Networks." Proceedings of the 14th ACM Conference on Embedded Network Sensor Systems CD-ROM.ACM, 2016, pp. 1-13.

De Guglielmo, Domenico, Simone Brienza, and Giuseppe Anastasi. "IEEE 802.15. 4e: A Survey." Computer Communications 88 (2016): pp. 1-24.

* cited by examiner

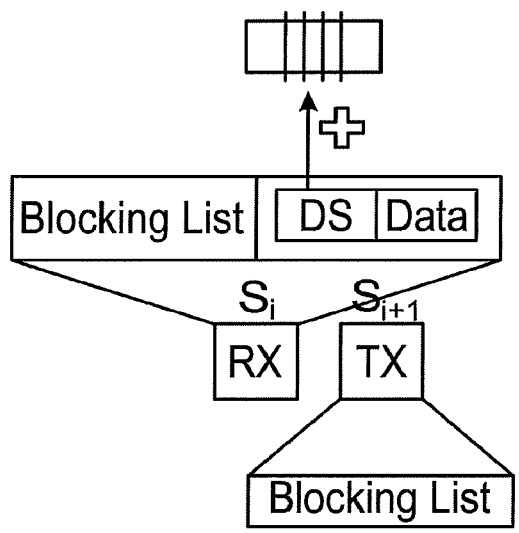
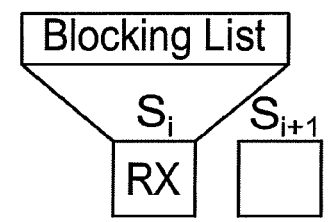
FIG. 5A    FIG. 5B
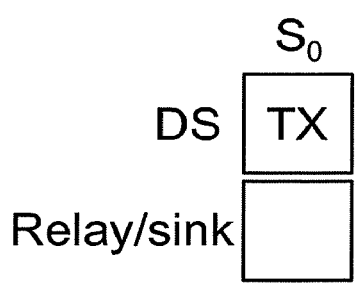
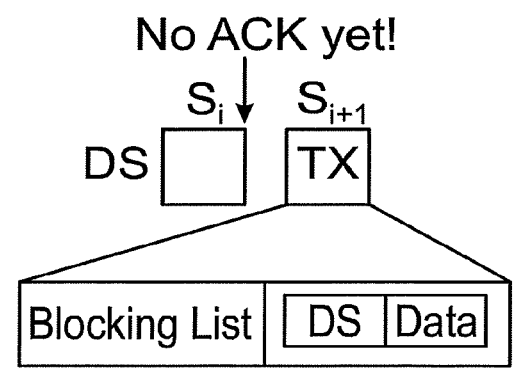
FIG. 6A    FIG. 6B

WIRELESS MESH NETWORK AND ASSOCIATED DATA TRANSMISSION NETWORK

FIELD

Embodiments described herein relate generally to wireless mesh networks and to associated data transmission methods. More specifically embodiments relate to a flooding technique for use in such networks.

BACKGROUND

In past decades, industrial control applications relied mostly on expensive wiring infrastructure to communicate sensed samples and control signals with ultra-high reliability and low latency. High cost of installing and maintaining wiring clearly motivates adoption of less expensive and easy-to-maintain wireless technologies. However, inherent unreliability and scepticism surrounding dependability of wireless systems hindered their wide industry adoption despite continuous performance improvements as a result of innovations from hardware design to network protocol stacks.

IEEE 802.15.4 served as an underlying technology for several industrial wireless standards, such as WirelessHART, ISA100.11a and more recently 6TiSCH. Most of these technologies come with a full network stack, which first estimates the link quality between wireless nodes and then organize them into a routing structure to minimize forwarding cost. Multiple nodes then start exchanging data over these routes and wireless medium, which causes collisions among their transmissions, leading to low communication reliability. To overcome this problem, complex scheduling algorithms are employed to arbitrate access between conflicting flows by assigning them different channels, time intervals or non-interfering links.

BRIEF DESCRIPTION OF THE DRAWINGS

In the following, embodiments will be described with reference to the drawings in which:

FIG. 5A provides a representation of a first rule that applies to the sink node;

FIG. 5B provides a representation of a second rule that applies to the sink node;

FIG. 6A provides a representation of a first rule that applies to the data sources;

FIG. 6B provides a representation of a second rule that applies to the data sources;

DETAILED DESCRIPTION

Figure 1:
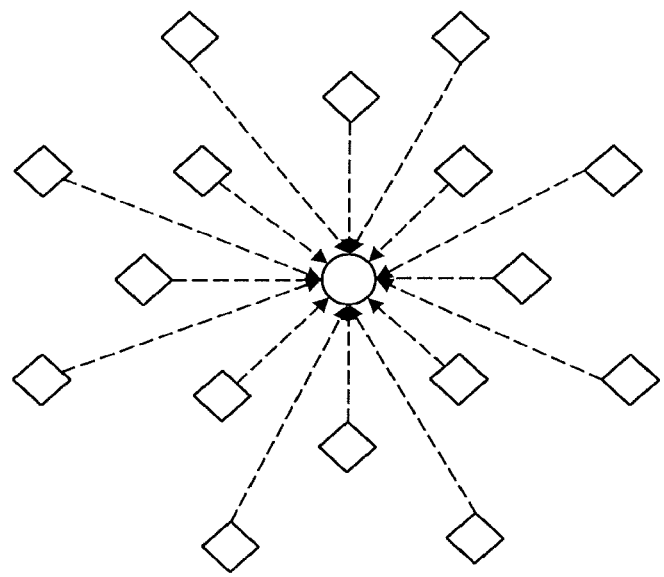
FIG. 1 illustrates a multiple to one transmission pattern in a wireless mesh network.

In an embodiment there is provided a node comprising a receiver, a transmitter, a controller and memory storing program instructions. The node is suitable for participating in time synchronised data re-transmission within a network. The program instructions causing the controller, when executed by the controller, to receive, via the receiver an indication of other nodes in the network to which data is or is not to be re-transmitted, update a list of other nodes in the network to which data is or is not to be re-transmitted stored within said memory using the indication, determine, based on the list, whether to re-transmits data received from another node in the network and when it is determined that said data is to be re-transmitted, re-transmit the received data using said transmitter. Data is re-transmitted in time synchronisation with other nodes.

In an embodiment the only data that is re-transmitted in a time slot is the data received in a single preceding time slot, preferably the data received in the immediately preceding time slot. In an embodiment, when it is determined that the data is not to be re-transmitted the data is not re-transmitted.

In an embodiment the program instructions further cause the controller, when executed by the controller, to transmit, alongside transmitted data a partial or full copy of the list. The transmitted partial or full copy of the list can be compressed.

In an embodiment the program instructions further cause the controller, when executed by the controller to, upon receipt of a data packet destined for the node, transmit in a subsequent transmission slot an indication that data from a node at which the received data has originated should not be re-transmitted.

In an embodiment the program instructions further cause the controller, when executed by the controller, to count a number of subsequent transmission slots in which not data is received and to deactivate the receiver and/or the transmitter when the count exceeds a predetermined number.

In an embodiment the program instructions further cause the controller, when executed by the controller to determine, solely based on decision criteria stored in said memory, on said list and, during time slots in which a signal is received, based on the received signal, whether to operate in transmit or receive mode in a next time slot.

In an embodiment the program instructions further cause the controller, when executed by the controller to, during time slots in which a signal is received, make said determination based on an initially received part of said signal.

In an embodiment the program instructions further cause the controller, when executed by the controller to, establish, once receipt of the signal during the time slot has been completed, whether or not the signal represents a valid data packet and to change said determination when it is established that the signal does not represent a valid data packet.

In another embodiment there is provided a time synchronised network comprising a plurality of any of the above described nodes. The network may support many-to one communication.

In an embodiment the network is a wireless sensor and/or actuator network or a cyber physical system.

In an embodiment there is provided a method of data transmission using flooding in a network of autonomous time synchronised nodes comprising, within a node, receiving an indication of other nodes in the network to which data is or is not to be re-transmitted, updating a list of other nodes in the network to which data is or is not to be re-transmitted, determining, based on the list, whether to re-transmits data received from another node in the network and, when it is determined that said data is to be re-transmitted, re-transmit the received data.

In an embodiment the re-transmission takes place concurrently with transmissions by other nodes in the network.

If packets from multiple transmitters precisely overlap in time, receivers often do not perceive these received signals as interfering destructively (collision) and therefore can successfully decode them. Two physical layer phenomena namely constructive interference and capture effect are responsible for this positive outcome.

Embodiments described herein do not need to build any network routes or use complex scheduling technique. Therefore, they minimise or even eliminate the overheads associated with estimating link quality, building routes and scheduling conflicting flows with its ultra-fast flooding primitive, which enables multiple nodes to transmit to a single or multiple pre-defined sink node without a need for a routing structure or a complex MAC schedule.

Embodiments described herein are particularly useful in networks that generate traffic with volume or pattern not known at design time or even not possible to predict accurately at runtime. Industrial control applications are examples of such applications. Competing solutions typically require knowledge about volume and pattern of traffic to estimate the right amount of radio resources to be allocated to network nodes. Such competing solutions are therefore not very suitable for unpredictable traffic. Known solutions that have to cater for situations in which traffic patterns and/or volumes are unknown either over- or under-provide radio resources. Achieving a good trade-off between different performance metrics such as reliability, end-to-end latency and energy efficiency remains as a challenge for such known solutions. Embodiments disclosed herein, on the other hand, adapt to traffic dynamicity and link losses and allocate the correct amount of radio resources, achieving reliable, fast and ultra-low power communication. Some embodiments exploits the two physical layer phenomenon of constructive interference and capture effect to achieve this on top of commercial off-the-shelf IEEE 802.15.4 devices.

The need for complex routing protocols or link layer scheduling techniques is obviated so that no cost needs to be spent on building routes and scheduling link-level transmissions. The embodiments adapt to unknown traffic types without compromising on energy efficiency, reliability or low latency. The adaptation to different traffic volumes makes the embodiments an ideal solution for the industrial control and process automation applications where volume and frequency of traffic sent between sensors, actuators and controllers can be unpredictable due to non-linearities of industrial processes.

The embodiments achieve several advantages over existing flooding primitives including a) Ultra-fast delivery of data by allowing multiple transmitters to send their data towards the destination at the same time b) Ultra high reliability achieved by cooperation among network nodes in transmitting only data that is not yet delivered to the destination c) High energy efficiency by keeping radio on for minimal time to guarantee that successful reception of all traffic to the destination. d) Easy adaptability to cater to also other traffic patterns different from many-to-one scenarios e) enhanced throughput and ultra-low latency where energy efficiency is not the core objective such as for main powered devices.

Structural features of the embodiments include:
a) Multiple transmissions per flooding round: embodiments enable transmissions from multiple source nodes to proceed in parallel to reach their destination, leading to low latency and higher network throughput.
b) Parallelization of acknowledgements and transmissions: The sink, on a successful reception, sends acknowledgements to network nodes in parallel with other on-going transmissions.
c) Cooperative data suppression and forwarding: Embodiments incorporate an intelligent network wide learning mechanism with which nodes learn about successfully delivered messages. This information enables the whole network to cooperate in curbing the forwarding of the delivered messages. This allows the embodiments to achieve higher reliability and quick convergence to a state where the sink has received all the transmitted messages.
d) Blocking list: Each node maintains a local data structure to keep a local record of the messages successfully received by the sink in each flood to help suppress unnecessary forwarding of these messages.
e) Time-critical Updating and Lookup of Blocking list: Embodiments achieve high reliability by constructive interference and capture effect. This requires precise overlapping of transmissions by network nodes. Therefore, embodiments perform any updating and lookups in the blocking list in a time critical fashion.
f) Traffic-adaptive Radio Duty Cycling: Embodiments include a radio duty-cycling mechanism, which adapts radio on time to total amount of traffic in the network. The embodiments detect when all traffic is successfully transmitted to the sink and turn off the radio transceivers on the network nodes based on this information. For this purpose, a unique distributed termination mechanism for flooding is incorporated.
g) Zero Routing and MAC scheduling costs: The embodiments incur zero overhead or signalling cost on building network routes or defining transmission schedules for individual links or nodes. They completely avoid inefficiencies of fixed schedules that could end up overprovisioning/under-provisioning radio resources.
h) Resilient to Link Failures and Node Mobility: The embodiments maintain consistently high reliability even if individual links fail or nodes move. This is achieved without a need for any reconfiguration in network routes or link level schedules. As long as nodes are wirelessly connected to rest of the network, the embodiments can deliver their data.
i) Channel Hopping: Embodiments and network protocols using this flooding approach can be extended to use channel hopping schemes.
j) Multiple patterns of communications: Embodiments are designed to communicate from multiple nodes to a single sink. However, it can be easily extended to handle different communication patterns e.g. a) multiple source nodes transmitting to multiple different destinations b) one source node transmitting to multiple destinations.

In the embodiments described herein the network does not (and does not need to) assume any knowledge of data sources such as number of data sources and their location in the network topology etc. This enables embodiments to work for any arbitrary traffic pattern generated by data sources and unpredictable amount of data. Nodes moreover do not need to maintain any routing information such as routing cost (gradient) to reach a destination. Even if network topology changes frequently due to mobility, multipath fading, interference, etc. embodiments are able to deliver their data as long as nodes are physically connected using the wireless channel. Each node can be identified with a unique ID and network nodes are time synchronized.

Different MAC techniques explicitly prevent multiple neighbouring transmitters from using exactly same radio resources (such as frequency channel and time slots) simultaneously to avoid any collision between them. Embodiments described herein, instead, let neighbouring nodes transmit at the same time, while assuring the onsets of reception of these transmissions fall within only a short time period. This enables the embodiments to exploit constructive interference and capture effect, enabling successful reception despite overlapping of multiple received signals. The length of this period varies between wireless technologies. Within the IEEE 802.15.4 standard, if multiple but identical signals from different transmitters reach a receiver within a 0.5 microseconds time period, the signals are likely to constructively interfere and the probability that packet can be decoded successfully is very high probability. If multiple different signals all arrive within 160 microseconds time interval and one of the signals is sufficiently stronger than the rest, the receiver can still "lock on" to the stronger signal and successfully decode this packet.

By exploiting constructive interference and capture effect embodiments worry less about collisions between parallel transmissions and concentrate more on forwarding the successfully decoded receptions from multiple sources to a destination over a multi-hop mesh network. This simplifies the scheduling significantly.

On successful reception of data from sources, the sink announces any acknowledgements synchronously with the on-going transmissions. The announcement of successfully delivered data enables the network nodes to listen, learn and keep a local record of the delivered packets in Blocking List. This knowledge is then used to suppress any further forwarding of the packets already delivered to the sink. Only packets that are not yet delivered to the sink or the acknowledgements that as yet not propagated across the mesh network are transmitted in subsequent time slots. The data suppression across network increases reliability of rest of useful transmissions.

As data sources transmit their data to the sink, the network learns in parallel on the basis of received acknowledgements, allowing suppressing of unnecessary data transmissions. Eventually, all data is delivered, resulting in a state whereby no node transmits any data in the network. The network nodes are configured to notice this "silence" in a completely distributed and autonomous fashion. The nodes in the embodiments exploit this "silence" to terminate the flooding round using its distributed termination algorithm.

In the following the data structures and data frame structure are described prior to a description of the distributed slot scheduling algorithm of the embodiments.

Data Structure

In the embodiments each node participating in a flooding event keeps a data structure referred to hereinafter as "Blocking List". The Blocking List contains information about successful receptions at the sink from potentially multiple data sources. This information is learnt by individual nodes as a result of receiving packets on the wireless channel. The data structure may contain ID of the network nodes and a mapping between node IDs and whether these nodes have delivered their data to the sink. The nodes are configured to limit the scope of the Blocking List to a single flooding round. Once the flooding round is over and the relevant data has been transmitted the Blocking List is cleared. This means that nodes start every new flooding round with a Blocking List containing no entries.

Data Frame Structure

Figure 2:
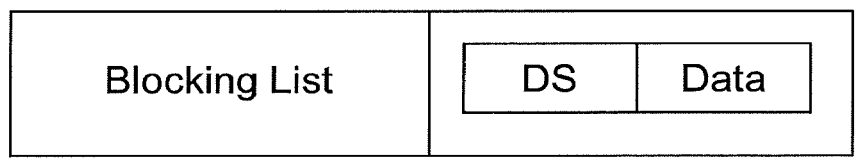
FIG. 2 illustrates a frame structure used in an embodiment.

The transmission frame contains not only the source data and source ID but also all or a subset of Blocking List entries, as shown in FIG. 2. These entries are preferably represented in a compressed form to minimize the nodes' overheads.

Distributed Slot Scheduling Algorithm

Embodiments do not rely on pre-established routing paths or information about total amount of traffic for routing multiple packets from different network nodes towards the sink. Instead, each node is configured to autonomously decide for each time slot if to transmit, listen or terminate the present flood. The nodes in particular incorporate a distributed slot scheduling algorithm that is governed by rules that depend on the operational roles of a node in each flood. Three operational roles for nodes are possible:

a) The node can be a data sources (DS) that has data to transmit to the sink
  b) The node is a relay node that do not have or no longer requires to send any data to the sink
  c) The node is a sink Some rules generally apply to all operational modes. Others only for individual roles.

Figure 3:
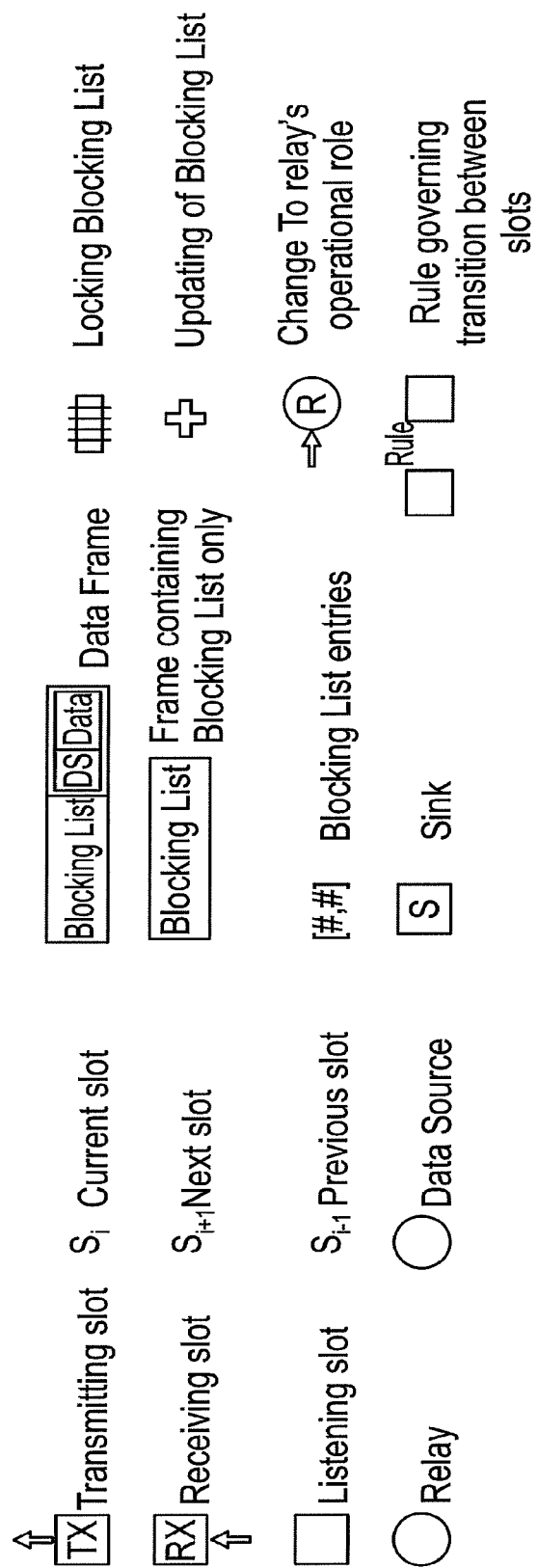
FIG. 3 provides a legend of notations used in FIGS. 4-8.
Figure 4A:
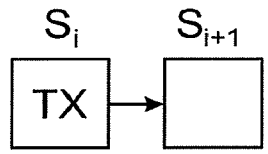
FIG. 4A provides a representation of a first rule that applies to all nodes type.
Figure 4B:
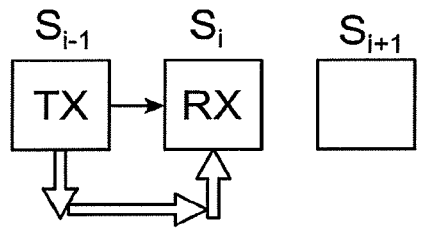
FIG. 4B provides a representation of a second rule that applies to all nodes type.
Figure 4C:
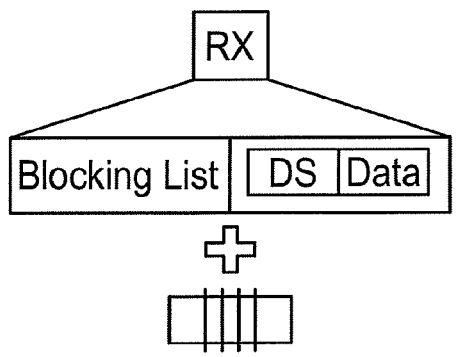
FIG. 4C provides a representation of a third rule that applies to all nodes type.
Figure 4D:
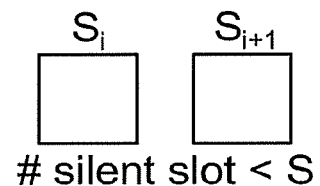
FIG. 4D provides a representation of a fourth rule that applies to all nodes type.

General Rules:

FIGS. 4A to 4D show a visual representation of the general rules. The legend for FIG. 4 is provided in FIG. 3.

Rule G1 (illustrated in FIG. 4A): At the end of each transmission slot $S_i$, the radio transitions to the listening mode in the next slot $S_{i+1}$. This rule applies to data sources, relays, and the sink. Rule G1 ensures that nodes should not only transmit but also listen and acquire knowledge about successful transmissions to the sink.

Rule G2 (illustrated in FIG. 4B): If a node receives a packet in its current listening slot $S_i$ that it itself transmitted in the previous slot $S_{i-1}$ then it preferably also listens in the next time slot $S_{i+1}$. This rule applies to data sources, relays, and the sink. This rule relieves the nodes from transmitting very aggressively if their most recent transmitted packet is heard and being forwarded in the network. The resulting reduction in number of transmissions improves the reliability of rest of transmissions.

Rule G3 (illustrated in FIG. 4C): Any node except the sink, on receiving a packet containing any blocking list entries, is preferably configured to update its local blocking list with new entries received with the packet. Nodes, according to Rule G3, try to learn from each successful reception about data delivery information to the sink. The new acquired knowledge is then used to make slot scheduling decisions in future.

Rule G4 (illustrated in FIG. 4D): Any nodes except data sources, on not receiving a packet in their listening slot $S_i$, will listen in slot $S_{i+1}$ unless number of consecutive silent slots are less than a predetermined number S of silent slots.

Sink Rules:

The sink is the node that collects all the data from the network in a single flood. The node acting as the sink node can be different for different flooding rounds. FIGS. 5A and 5B shows a visual representation of the rules applicable to the sink as per legend shown in FIG. 3.

Rule S1 (illustrated in FIG. 5A): On reception of a packet containing data from a source in slot $S_i$, the sink transmits only the Blocking List in slot $S_{i+1}$. The sink, on reception of actual data originated at one of the data sources, updates its local record of successfully received packets. It adds them to its local Blocking List and sends acknowledgement to the data sources by announcing a compressed Blocking List through its out-going packets. These announcements are sent by the sink and forwarded by other nodes in parallel with actual data transmissions from data sources.

Rule S2 (illustrated in FIG. 5B): On reception of only a Blocking List (and no data from a data source) in slot $S_i$, the sink listens in slot $S_{i+1}$ if it is the only sink in the network. In this case, sink is the authority to update and announce Blocking List and therefore, it has always an up-to-date knowledge of the blocked nodes/packets. On receiving this information from the network, it listens again in a hope to listen any data from data sources. If the sink is not the only sink in the network and receives only a Blocking List (and no data from data source) the sink first updates its local Blocking list to reflect any change in the Blocking list caused by other sinks in the network. If its local Blocking list has changed as a result of this update the sink transmits its updated Blocking list in slot $S_{i+1}$. If no update was made the sink switches to listening mode in slot $S_{i+1}$.

Rule S3: This rule is the same as Rule R3/S3 under Distributed Termination Scheme.

Data Sources Rules

Figure 6C:
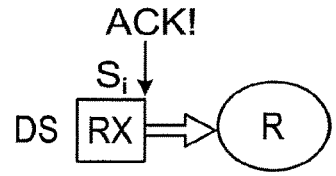
FIG. 6C provides a representation of a third rule that applies to the data sources.

Data sources include the nodes that have their own data to transmit to the sink. FIGS. 6A to 6C show a visual representation of the rules applicable to the data sources as per the legend shown in FIG. 3.

Rule DS1 (illustrated in FIG. 6A): The network in which the nodes operate is time synchronised and a start time for a first transmissions slot is agreed. All data source nodes transmit their own data in the very first slot $S_0$ at the start of the flooding round, while sink and relay nodes listen in the same slot. In a flooding round, multiple sources may have data to transmit to the sink, which they inject into the network in the first time slot of the round.

Rule DS2 (illustrated in FIG. 6B): If Rules G1 and G2 do not apply for a data source that has not yet received an ACK against its data in current listening slot $S_i$, it will transmit in the slot $S_{i+1}$ its data piggybacking its own blocking list. As per Rule DS2, each data source has to follow its own agenda to transmit the data to the sink unless it learns about successful delivering of its packet to the sink.

Rule DS3 (illustrated in FIG. 6C): If a data source receives an ACK against its own data in the current listening slot $S_i$, then it will assume a role of relay node until the end of the current flooding round. The rules for relay nodes will apply for all next slots. As per Rule DS3, after a source hears about successful delivery of its data to the sink, it would become relay node and forward traffic for other data sources if any.

Relay Nodes:

Relay nodes are the nodes that do not have their own data to transmit to the sink. These include the data sources that received an ACK against their own data (see Rule DS3 above) at some point in the flooding round.

Figure 7:
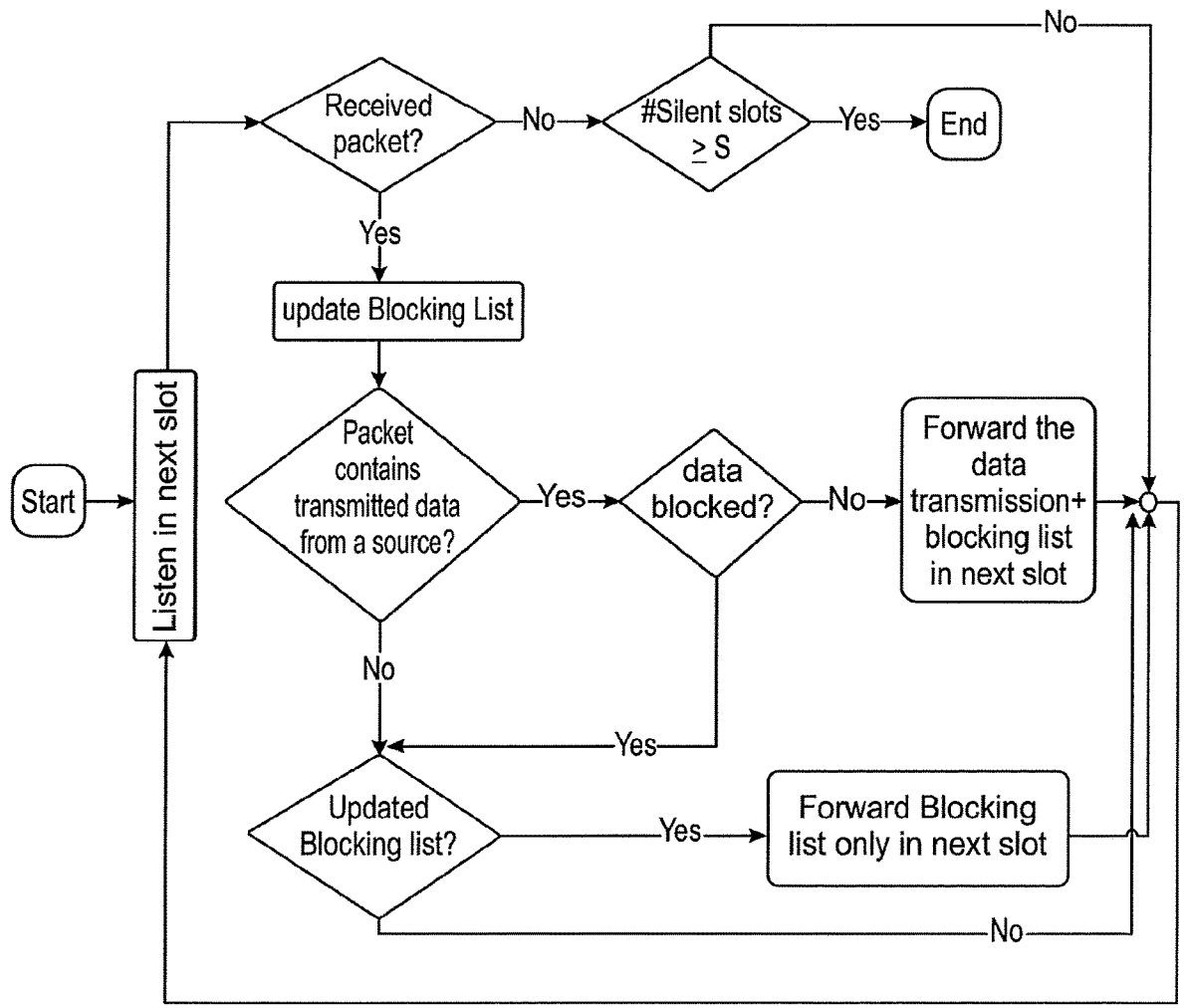
FIG. 7 is a flowchart explaining the distributed slot scheduling algorithm for relay nodes.

The decision by a relay node to listen, transmit or terminate the flooding round in the next slot is illustrated in the flowchart in FIG. 7. As evident from the figure, the relay nodes start their operation by listening in their first slot. When a relay node actually hears a packet, it first updates its local Blocking List with any additional blocked nodes announced in the received packet. The flowchart can be summarised in the rules R1-R4 given below:

Rule R1: relay node will transmit both the updated Blocking list and data from a data source in slot $S_{i+1}$ if the received packet in slot $S_i$ contains data from a source that is not mentioned in its Blocking list.

Rule R2: A relay node will transmit only the updated Blocking list in slot $S_{i+1}$ if
  the received packet in slot $S_i$ contains data from a source that exists in its Blocking list
  OR
  the received packet in slot $S_i$ contains a Blocking list (and no data) that list is different from its local Blocking list Rule R3: This rules is identical to Rule R3/S3 under Distributed Termination Scheme.

Rule R4: A relay node listens in slot $S_{i+1}$ if none of the Rules from R1 to R3 and G1 to G4 applies.

Figure 8:
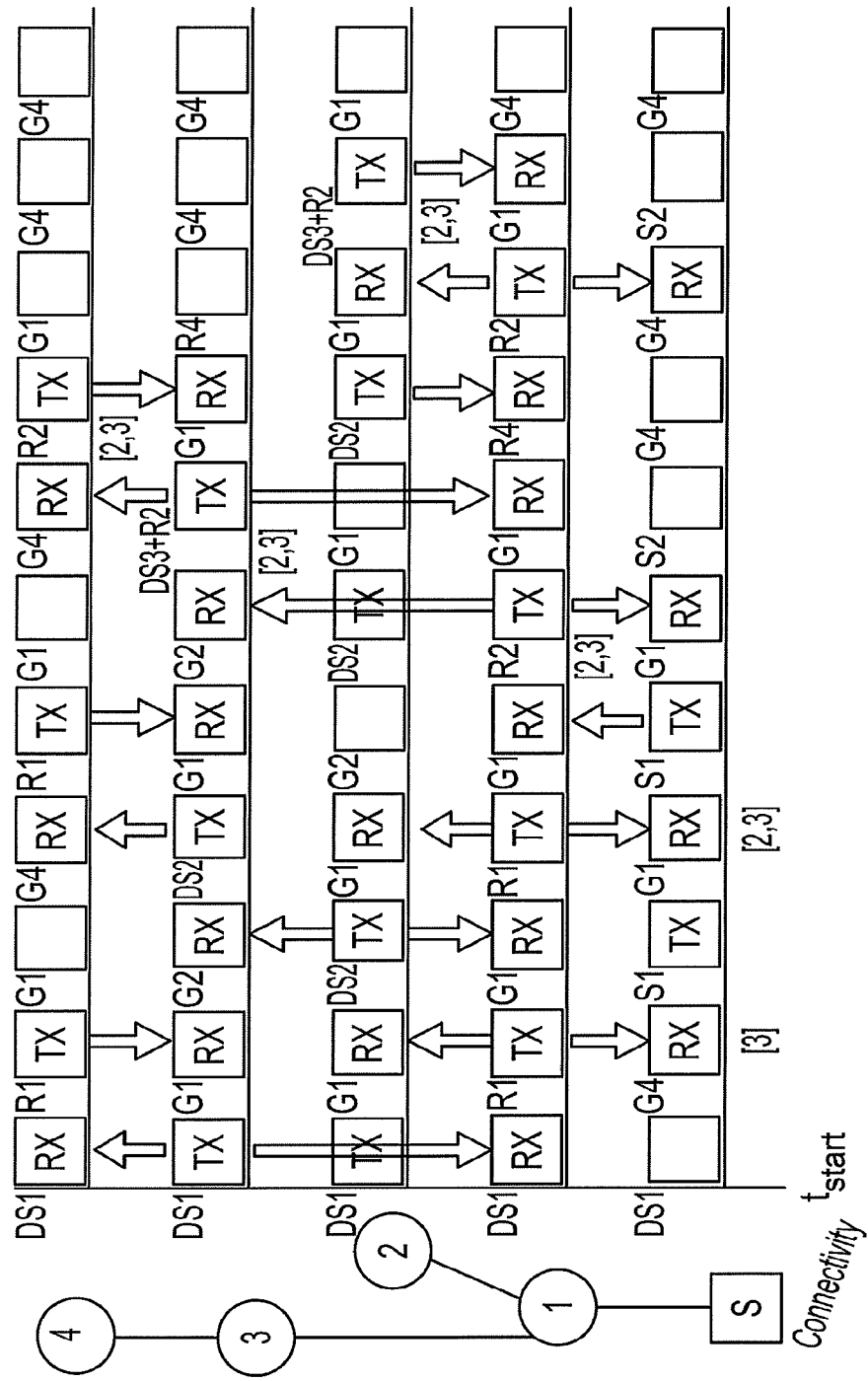
FIG. 8 illustrates and example flooding according to an embodiment.

FIG. 8 shows an example of a slot schedule built on-the-fly according to an embodiment for a network of two data sources, two relay nodes and a sink node. The figure shows, in the left-hand column, the connectivity of the network nodes along with individual slot assignments for each node. The rules governing radio actions performed in each slot are also highlighted as well.

Time slot $S_0$:

In time slot $S_0$ two data sources, nodes 2 and 3 transmit their respective data packages to adjacent nodes according to Rule DS1. Nodes 1 and 4 as well as the sink node S are in receive mode.

Time slot $S_1$:

As nodes 2 and 3 have transmitted in slot $S_0$ they switch to receive mode in slot S1 according to rule G1. The transmission from node 3 received at node 1 was stronger than the transmission received at node 1 from node 2, so that both nodes 1 and 4 have received the data from node 3. According to Rule R1 both nodes 1 and 4 re-transmit the data received from node 3. The sink S receives the data from node 3 in slot S1 in this manner and updates its (master) blocking list to block node 3 (as indicated in FIG. 8 in square brackets). According to Rule S1 the sink only transmits the blocking list in slot S2.

Time slot $S_2$:

Node S2 has received the data originating from node 3 in slot S1 and consequently knows that its own transmission in slot $S_0$ has not been successful. As a consequence node 2 transmits its own data a second time in slot S2 according to Rule DS2. Nodes 1 and 4 are in receive mode according to Rule G1 and node 3 is in receive mode according to Rule G2 in slot S2.

Time slot $S_3$:

In slot S2 the data originating from node 2 has been received at node 1 and node 1 relays this data to the source S according to Rule R1 in slot S3. The source S is in listening mode according to Rule G1 (having just attempted to transmit its blocking list to node 1), receives the packet from node 1 and updates its Blocking list to also include node 2, so that the now updated blocking list includes both nodes 2 and 3, as indicated in FIG. 8. Node 2 is also in listening mode according to Rule G1 whilst node 3 attempts to transmits its original data again according to Rule DS2, not having received an acknowledgement of receipt of the data from the source. Node 4 is in listening mode according to Rule 4.

Time slot $S_4$:

In time slot S4 node 4 relays the data received in slot S3 according to Rule R1 while nodes 1, 2 and 3 are in listening mode according to Rules G1, G2 and G1 respectively. This time slot is the first time that the transmission of the Blocking List by sink S according to rule S1 is successful and is received by node 1. Node 1 updates its only (up to this point empty) blocking list as indicated in FIG. 8.

Time slot S5:

The sink S and nodes 3 and 4 are in receive mode according to Rule G1, G2 and G1 respectively while node 1 relays only the blocking list received from the source in the preceding slot. Node 2 has not yet received acknowledgement from the sink S that the data originating from it has been received at the sink S and consequently starts another attempt at transmitting its data according to Rule DS2. This attempt is, however, unsuccessful as the signal strength of the transmission from node 1 overrides the transmission of node 2.

Time slot $S_6$:

The sink and nodes 1, 2 and 4 are in receive mode according to Rules S2, G1, G1 and G4, while node 3 according to Rules DS3 and R2 relays the blocking list previously received from node 1. This blocking list is received by node 4, so that now nodes 1 and 4 as well as the sink have up to date blocking lists.

Time slot $S_7$:

In slot S7 node 4 relays the blocking list while nodes 1 and 3 as well as the sink S are in receiving mode according to Rules R4, G1 and G4 respectively. Node 2 again attempts to transmit its data according to Rule DS2, not having received an acknowledgement of receipt from the source S yet.

Time slot $S_8$:

Node 1 relays the data received from node 2 alongside its up to date blocking list. Nodes 2, 3 and 4 as well as the sink S are in receive mode according to Rules G1, R4, G1 and G4 respectively. With the receipt of the blocking list in which node 2 is mentioned, node 2 knows that the data is sought to transmit to the sink S. As a consequence node 2 stops attempting to transmit the data.

Time slot $S_9$:

Node 2 transmits the now up to date blocking list according to Rules DS3 and R2 while the sink S and nodes 1, 3 and 4 are in receive mode following rules S2, G1, G4 and G4.

Time slot $S_{10}$:

In this time slot all data has been successfully transmitted and the sink S and all nodes are in receive mode according to Rules G4, G4, G1, G4 and G4 respectively.

Distributed Termination Scheme

Embodiments use a distributed termination scheme that enables nodes to go back to sleep or initiate more data transmissions after a flood as, for example, described above, has successfully delivered data to the sink from all the source nodes. Once all data has been successfully transmitted the network nodes should have reached a consensus that all the transmitting nodes have indeed transmitted their data to the sink, as discussed above. In an embodiment the relay nodes as well as the sink adopt a termination scheme governed by Rule R3/S3 below:

Rule R3/S3: If a relay node or the sink does not receive a valid packet for S consecutive slots, wherein S is a predetermined number of slots, while noise present on the channel is also insignificant (this may, for example, be assessed by Clear Channel Assessment (CCA)), the node/sink is configured to assume that the network has already transmitted all its data to the sink. In this situation the node concludes its flooding round and decides to either turn off its radio to save energy or to participate in next flood to send/receive more data.

Time Critical Slot Scheduling Decisions

To maximise the benefits available from constructive interference and the above discussed capture effect, multiple transmissions from neighbouring nodes should fall within tight time bounds. This means that in an embodiment nodes should decide to transmit or listen in each slot according to the rules stated above in a constant time. A decision after a transmission slot is straightforward as it is always to listen in the next slot (see Rule G1) and therefore can be made in no time. However, a decision after each listening slot is governed by a state machine defined by rest of the rules (G2-G4, S1-S3, DS1-DS3, R1-R4). The number of operations and predicates (if/else, switch statements) may be different for different neighbouring nodes depending on their operational mode (Relay/Sink/Data Source) and the rules applicable due to nodes' internal state (Blocking List) and receptions and transmissions in recent time slots. To make this decision in constant time, embodiments use the MCU processing power in parallel with the radio activities (transmissions, listening, receiving).

Embodiments differ in this respect from an approach in which a microcontroller waits for radio transceiver to finish receiving a packet completely before copying it to its own buffers for further processing. In the embodiment processing at MCU is parallelised with transmission and reception activities at radio transceiver as much as possible. This is achieved by reading and processing each byte one-by-one from radio transceiver to MCU, while radio of the node is still busy receiving a packet. Embodiments evaluate the rules stated above to reach to conclusion whether to listen, transmit, or terminate the packet. As receiving a single byte over air by the radio is typically slower than transferring the same from the transceiver to MCU, it gives the MCU extra time to apply the rules on the already received byte before the arrival of the next one at the radio. This decision holds only if the received packet is known to be not corrupt. In an embodiment an alternative decision to transmit, listen or terminate is also evaluated in case the received packet turns out to be corrupt. Once the node has determined whether or not the packet is corrupt one of the two decisions is chosen. In this way the decision making process for scheduling in the next slot is expedited.

Storing Blocking List locally and disseminating it along the transmitted packets enables a network-wide cooperative learning approach for reliable network routing under unpredictable network connectivity, traffic, interference and multipath fading. The data sources and relay nodes overhear this information and use it to suppress redundant copies of transmitted packets already received at the sink, restricting data forwarding to only the packets not yet delivered to the sink.

It is emphasised that embodiments do not restrict the network to choose only a single sink. Instead, each flooding round can have a different set of sinks, if desired. In most other routing based approaches, in such cases, routing paths are re-built each time a sink is changed, resulting in additional overhead. This is not necessary in the embodiments. Furthermore, every time a routing link breaks in known mechanisms, not only does the routing paths need to be reformed but any slot assignment to the nodes for transmissions and receptions of their data need to be re-done. Therefore, such known approaches are more suitable for static networks with stable links and known traffic profile, which generally limit the number of times such adjustments are required. Embodiments discussed herein, on the other hand, provide a stateless protocol that is resilient to mobility and change in routing paths. The scheduling of transmissions and receptions in each slot is done on-the-fly solely based on only transmissions and reception occurring in small window of previous time slots locally to the node. No additional signalling with neighbours is required.

By not exploiting any a priori knowledge or estimate of traffic in the network, the slot scheduling algorithm of the embodiments is not negatively affected if traffic in network changes due to bad channel. Yet, it adapts to total traffic in the network, allowing nodes to terminate the flooding process early for low traffic volume (that is in situation in which data is transmitted rapidly) and prolong it otherwise. This means that latency experienced by the nodes depends on total traffic in the network among other factors (such as channel conditions, network topology, network size, etc.).

Most other known protocols for multi-hop mesh networks provide only link-level ACKs and retransmissions against any losses. If a packet is lost midway on its route to destination, its recovery is left to higher layers such as transport and application layers. Embodiments incorporate an end-to-end in-network acknowledgement mechanism between sources and the sink much like TCP does for traditional IP traffic. This effectively increases network reliability, making the embodiments very suitable for ultra-high reliable systems and applications.

The embodiments bring several advantages described as follows.

Compared to traditional as well as 6TiSCH based solutions, the embodiments do not incur any cost of building routes or signalling in defining transmission schedules. This makes provides resilience to changes in network topology and mobility of the nodes, consistently delivering ultra-high reliability in such dynamic scenarios.

The embodiments adapt their operation to unpredictable amount of data traffic.

Embodiments deliver data from multiple transmitters to a single sink quickly in a single flood. By parallelising multiple transmissions, high throughput and low average latency is achieved.

The embodiments provide an energy efficient flooding primitive, enabling nodes transmitting unpredictable but not excessive amount of traffic to extend lifetime to multiple years.

The embodiments ensure efficient utilization of radio resources and minimizes end-to-end latency compared to other synchronous transmissions based protocols for many to one traffic patterns. A time slotted nature of the embodiments enables them to be easily extended to channel hopping schemes so to make protocol resilient to frequency selective fading.

The embodiments exploit spatial diversity by using multiple transmitters and receivers at the same time. This enables embodiments to cope up with harsh environments and external interference.

Figure 9:
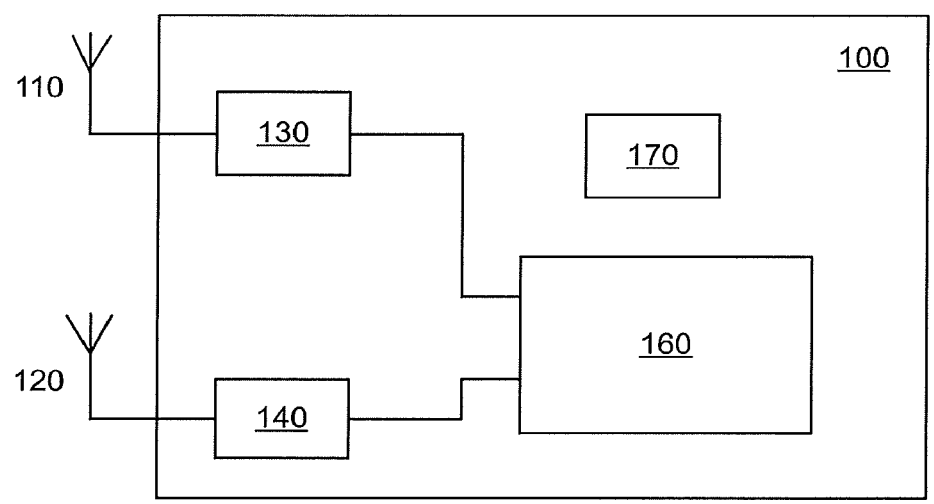
FIG. 9 illustrates a node according to an embodiment.

FIG. 9 shows a node 100 according to an embodiment. The node comprises a transmit 110 and a receive 120 antenna or a combined antenna used for both transmission and reception, a transmit chain 130 and a receive chain 140. The node moreover comprises a controller 160 and non-volatile memory 170. The controller 150 is configured to access computer program instructions stored in the memory 170 and to execute the methods described herein on the basis of these instructions.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions.

The accompanying claims and their equivalents are intended to cover such forms or modifications as would fall within the scope and spirit of the inventions.

The invention claimed is:

1. A communication apparatus configured for time synchronized data re-transmission within a network comprising electronic apparatuses, the communication apparatus comprising:
    a memory configured to store a blocking list, wherein each entry in the blocking list includes:
        a record of a data packet successfully received by at least one of the electronic apparatuses in the network, and
        a blocked node that is another electronic apparatus of the network that transmitted the data packet to the least one of the electronic apparatuses in the network;
    receiver circuitry configured to:
        receive an indication that a first electronic apparatus of the electronic apparatuses in the network successfully received a first data packet destined for the first electronic apparatus, wherein the first data packet originated at a second electronic apparatus of the electronic apparatuses in the network, and
        receive the first data packet from the second electronic apparatus;
    control circuitry configured to:
        update the blocking list, based on the received indication, by adding an entry to the blocking list that includes a record of the first data packet and the second electronic apparatus as a blocked node; and
        upon receiving the first data packet from the second electronic apparatus, determine whether the second electronic apparatus is a blocked node in an updated blocking list based on the added entry; and
    transmitter circuitry configured to, in response to determining that the second electronic apparatus is a blocked node in the updated blocking list, transmit the updated blocking list in a subsequent transmission slot indicating that the first data packet from the second electronic apparatus is not to be transmitted.

2. The communication apparatus as claimed in claim 1, wherein the transmitter circuitry is further configured to, upon receiving a second data packet from a third electronic apparatus which is not in the updated blocking list, transmit, alongside the received second data packet from the third electronic apparatus, the updated blocking list.

3. The communication apparatus as claimed in claim 1, wherein the control circuitry is further configured to count a number of subsequent transmission slots in which data is not received and to deactivate the receiver circuitry and/or the transmitter circuitry in response to determining that the count exceeds a predetermined number.

4. The communication apparatus as claimed in claim 1, wherein the control circuitry is further configured to determine whether to operate in a transmit mode or a receive mode in a next time slot, said determination being based solely on decision criteria stored in said memory, on said blocking list and, during time slots in which a signal is received, on the received signal.

5. The communication apparatus as claimed in claim 4, wherein the control circuitry is further configured to, during the time slots in which the signal is received, make said determination based on an initially received part of said signal.

6. The communication apparatus as claimed in claim 5, wherein the control circuitry is further configured to establish, once receipt of the signal during a time slot has been completed, whether or not the signal represents a valid data packet and to change said determination in response to establishing that the signal does not represent a valid data packet.

7. A time synchronized network comprising a plurality of communication apparatuses as claimed in claim 1.

8. The network as claimed in claim 7, wherein the network is a network comprising a wireless sensor and/or an actuator or wherein the network is a cyber physical system.

9. The communication apparatus as claimed in claim 1, wherein the control circuitry is further configured to clear the blocking list after relevant data packets have been transmitted.

10. The communication apparatus as claimed in claim 1, wherein the control circuitry is further configured to, upon receipt of only a list from the first electronic apparatus in the network, update the blocking list to reflect any change caused by the first electronic apparatus.

11. A method of communication in a network of autonomous time synchronized electronic apparatuses, the method comprising, within a communication apparatus:

storing a blocking list, wherein each entry in the blocking list includes:

a record of a data packet successfully received by at least one of the electronic apparatuses in the network; and a blocked node that is another electronic apparatus of the network that transmitted the data packet to the least one of the electronic apparatuses in the network;

receiving an indication that a first electronic apparatus of the electronic apparatuses in the network successfully received a first data packet destined for the first electronic apparatus, wherein the first data packet originated at a second electronic apparatus of the electronic apparatuses in the network, and receiving the first data packet from the second electronic apparatus;

updating the blocking list, based on the received indication, by adding an entry to the blocking list that includes a record of the first data packet and the second electronic apparatus as a blocked node; and upon receiving the first data packet from the second electronic apparatus, determining whether the second electronic apparatus is a blocked node in an updated blocking list based on the added entry; and transmitting, in response to determining that the second electronic apparatus is a blocked node in the updated blocking list, the updated blocking list in a subsequent transmission slot indicating that the first data packet from the second electronic apparatus is not to be transmitted.

* * * * *